United States Patent [19]

Lalanne et al.

[11] Patent Number: 4,724,245

[45] Date of Patent: Feb. 9, 1988

[54] PROCESS FOR THE PREPARATION OF AN AQUEOUS EMULSION COMPOSITION OF ASPHALT-POLYURETHANE

[75] Inventors: Marie-Florence Lalanne, Talence; Jean-Pierre Serfass, Paris, both of France

[73] Assignee: Screg Routes et Travaux Publics, Paris, France

[21] Appl. No.: 910,995

[22] Filed: Sep. 24, 1986

[30] Foreign Application Priority Data

Sep. 30, 1985 [FR] France ............................ 85 14472

[51] Int. Cl.$^4$ .............................................. C08L 95/00
[52] U.S. Cl. ........................................ 524/61; 524/60; 525/54.5
[58] Field of Search ................. 524/60, 61; 525/54.5

[56] References Cited

U.S. PATENT DOCUMENTS

| | | | |
|---|---|---|---|
| 3,324,041 | 6/1967 | Sommer et al. | 252/311.5 |
| 3,909,474 | 9/1975 | Borchert et al. | 260/28 |
| 3,932,331 | 1/1976 | Doi et al. | 260/28 |
| 4,530,947 | 7/1985 | Kojo et al. | 525/54.5 |
| 4,535,103 | 8/1985 | Koja et al. | 525/54.5 |

FOREIGN PATENT DOCUMENTS

2052703 5/1971 Fed. Rep. of Germany .
1567320 5/1969 France .
2250858 6/1975 France .

Primary Examiner—Allan M. Lieberman
Attorney, Agent, or Firm—Wenderoth, Lind & Ponack

[57] ABSTRACT

The process according to the invention is characterized by the following stages:

(A) an emulsion of asphalt composition is made starting from (a) an asphalt composition prepared by adding, at a temperature of 100° to 150° C., 20 to 95 parts of asphalt to 5 to 80 parts by weight of a polyurethane extender and from (b) an aqueous phase obtained by solution in water of 1 to 20% by weight of an emulsifier chosen from a polyamine hydrochloride, an amido-amine hydrochloride and a quaternary ammonium salt, then the asphalt composition (a), taken to a temperature of 120° to 150° C., is emulsified with the aqueous phase (b), taken to a temperature of 40° to 80° C.; p0 (B) a polyisocyanate aqueous emulsion is made by mixing, under strong agitation, 20 to 50 parts by weight of an organic polyisocyanate made up to 100 parts with water; and (C) the emulsions (A) and (B) are mixed. They then form, by reticulation at ambient temperature, a polyurethane in the mixture.

Use cold in paints, coatings, grouts and surfacings.

8 Claims, No Drawings

PROCESS FOR THE PREPARATION OF AN AQUEOUS EMULSION COMPOSITION OF ASPHALT-POLYURETHANE

The present invention concerns a process for the preparation of an aqueous emulsion composition of asphalt-polyurethane which can reticulate at ambient temperature.

The use of polymers of the type of emulsions of asphalt-polymers is widely known, particularly in the road construction domain. In fact, the incorporation of polymers in asphalts modifies their properties in the direction of an improvement in the thermal susceptibility and in the resistance to rupture. However, their use is limited by a delicate operational requirement which necessitates temperatures of 160° to 180° C., causing degradations of the polymers, which alter the mechanical performance of the binder.

To get round these disadvantages, thought has been given to developing asphalt-polymer emulsions with latexes of polymers. In order to obtain the asphalt-polymers without degrading them, thought has also been given to developing polymers in situ in the asphalt by making the constituents react together.

More particularly, polyurethanes and epoxide resins have been used.

In a general way, when it is desired to make asphalt-polyurethane compounds in situ, polyurethane extenders and isocyanates are added to an asphalt material which react to form a hardening composition (see for example U.S. Pat. Nos. 3,179,610, 3,738,807, 3,372,083, GB Pat. No. 915 961, JA Pat. Nos. 79, 14 426, 81, 157 450, 57, 153 056 and 78, 11 953 (Kokai)). In all these patents, the usual mode of operation consists of mixing an asphalt material with isocyanates and polyurethane extenders at temperatures ranging in general from 80° to 120° C. or at lower temperatures provided that a solvent is used.

Where epoxide resins are used, an epoxide resin and an amino hardener are added to an asphalt material at a temperature of 80° to 90° C., or in a solvent medium at a lower temperature (GB Pat. No. 2 076 824 or JA Pat. Nos. 58, 32659, 82, 00157). However, the making of asphalt emulsions is difficult because of the increase in viscosity caused by the hardening of the compositions. Moreover, in the case of the polyurethanes, a problem is caused by foaming due to the reactivity of the isocyanates with water.

Thus, the U.S. Pat. No. 3,932,331 describes a method for breaking down and rapidly hardening an asphalt emulsion by incorporating a urethane prepolymer with an NCO termination which is formed by reaction at 80°-120° of a diisocyanate and a polyalkyleneglycol. When the prepolymer is added to the asphalt emulsion, it reacts with the water, which has the effect of breaking down the emulsion. This makes it impossible to store the asphalt emulsion-prepolymer mixture, and makes necessary the almost simultaneous application of the two constituents which is a constraint on the efficacious usage.

The patent U.S. Pat. No. 3,909,474 describes an asphalt composition of asphalt, polyol catalyst-isocyanate, which hardens after oxidation of the asphalt constituent. When the composition is emulsified, the water prevents polymerisation from following as a result of the reaction with the isocyanates. Moreover, problems with foam are possible when emulsifying and in store.

In the patent U.S. Pat. No. 3,324,041 an emusion is described where the dispersed phase comprises a polyepoxide and an asphalt material. It is obtained by mixing two emulsions. In the asphalt emulsion, there is the asphalt material, a polyamide and a hydrogen bonding agent. Another emulsion comprises a polyepoxide and a non-ionic emulsifier. Separately, the emulsions are stable for a long time. But, when they are mixed, the final emulsion has a pot life of 16 hrs at 20° C. The reaction takes place the moment they are mixed, so it is necessary to store each of the emulsions independently and only mix them a short time before use.

The present invention solves this problem of storage by producing an emulsion which is stable for several months without deteriorating or altering the qualities of the broken-down binder.

The subject of the invention is therefore a process for the preparation of an aqueous emulsion composition of asphalt-polyurethane, characterized by the following stages:

(A) an emulsion of asphalt composition is made starting from (a) an asphalt composition made by adding, at a temperature of 100° to 150° C. 20 to 95 parts asphalt to 5 to 80 parts by weight of a polyurethane extender and from (b) an aqueous phase obtained by solution in water of 1 to 20% by weight of an emulsifier chosen from a polyamine hydrochloride, an amido-amine hydrochloride and a quaternary ammonium salt salt, then the asphalt composition (a) taken to a temperature of 120° to 150° is emulsified with the aqueous phase (b) taken to a temperature of 40° to 80° C.;

(B) an aqueous polyisocyanate emulsion is made by mixing, under strong agitation, 20 to 50 parts by weight of an organic polyisocyanate made up to 100 parts with water; and (C) the emulsions (A) and (B) are mixed.

As asphalt, a directly distilled asphalt can be used, having, for example, a penetration of 80/100 or 180/220.

The polyurethane extender can in particular be chosen from a polyethyleneglycol (PEG), polypropyleneglycol (PPG), copolymers of PEG and of PPG, polyester polyethers, or preferably from hydroxytelechelic polybutadene (HTPB) (ie with hydroxyl terminations).

The aqueous phase (b) is obtained by solution in water of 1 to 20% by weight of the emulsifier constituted by a polyamine hydrochloride, an amido-amine hydrochloride or a quaternary ammonium salt. The polyamines, amido-amines and quaternary ammonium emulsifiers are well known in the literature and in general contain at least one radical constituted by a fatty aliphatic chain, particularly an alkyl in $C_8$ to $C_{22}$, for example, a radical derived from copra, from tallow, from oleic, palmitic, stearic acids, etc. Polyamines of the polyamine polyalkylene type possibly oxyalkylized, and alkylamidomines (obtained be reaction of a fatty acid on a diamine) are described or used for example in FR Pat. Nos. 2 109 474, 2 259 824, 2 367 820, 2 492 683, etc. Among the quaternary ammonium emulsifiers which can be used, there can be cited those which contain one or two radicals with a fatty aliphatic chain, particularly an alkyl of $C_8$ to $C_{22}$, the two, or if required three, other groups being lower alkyl, hydroxyalky or aralkyl radicals, particularly methyl, ethyl, hydroxyethyl or benzyl.

In the case of polyamine or amido-amine hydrochlorides, these are put into solution in particular at a temperature ranging from 40° to 80° C., preferably about 60° C., then, to obtain the hydrochloride, a solution of hydrochloric acid is added in such a way that the general polyamine/acid ratio is 0.5 to 0.8, preferably about 0.7, or that the ratio of amido-amine/acid is 2 to 3.5, preferably about 3. When an ammonium salt is used, it is dissolved at ambient temperature, without the addition of acid.

The emulsion of asphalt composition (A) is preferably obtained starting with an asphalt composition (a) taken to about 140° C. and an aqueous phase (b) taken to about 60° C., in a quantity such that the binder content of the emulsion is from 50 to 75% by weight, in particular 60%. Such an emulsion is stable for several months.

As organic polyisocyanates, aromatic polyisocyanates can be used, or even prepolymers with isocyanate radical terminations obtained by reaction of an excess of polyisocyanate with a polyether or polyester with hydroxyl radical terminations, or with a monomer polyol. Preferably, aromatic di- or tri-isocyanates are used, such as the diisocyanates of the following:- phenyl, toluylene, chlorophenylene, naphthylene, diphenylmethane, diphenylene or diphenylether, in particular diphenylene-4,4'-diisocyanate, 3,3'-dimethyldiphenyl-4,4'-diisocyanate or 3-methyldiphenylmethane-4,4'-diisocyanate or the triisocyanates such as 2,4,6-triisocyanatotoluene and 2,4,4'-triisocyanatodiphenylether. It is preferred to be diphenylmethane-4,4'-diisocyanate.

According to a variant, the aqueous polyisocyanate emulsion (B) is stabilized by adding a certain quantity of aqueous phase (b) previously prepared, in particular from 1 to 9 parts by weight of aqueous phase, for example 3 parts, for 1 part of emulsion (B), and by homogenization under gentle agitation.

To obtain the composite emulsion according to the invention, it is sufficient to mix the emulsion of the asphalt composition (A) at ambient temperature with the polyisocyanate emulsion (B) unstabilized or stabilized as described above.

As proportions, there can for example be added from 4 to 50 parts of unstabilized polyisocyanate emulsion (B) to 100 parts of emulsion of asphalt composition (A).

As an alternative, there can be added from 15 to 120 parts of stabilized polyisocyanate emulsion to 100 parts of asphalt emulsion (A).

If the unstabilized polyisocyanate emulsion is used, it must be added to the asphalt emulsion immediately after its production because it is not stable for longer than 2 hours. The composite emulsion, on the contrary, can remain stable for several months due to the fact that the polyisocyanate emulsion stabilizes on contact with the aqueous phase of the asphalt emulsion.

If the stabilized polyisocyanate emulsion is used, it can be stored for a few days before being mixed with the asphalt emulsion. The composite emulsion obtained in this latter case is also stable since the stabilized polyisocyanate emulsion is further stabilized by contact with the aqueous phase of the asphalt emulsion.

When a stable emulsion has been obtained, it is necessary to verify that after break-down, there is a reaction of the isocyanates with the polyurethane extenders in situ so as to obtain a polyurethane-asphalt.

In order to show the polyurethane formation reaction, the composite emulsion has been broken down immediately after its production and the reaction has been followed with infra-red. The decrease in intensity of the absorption peak of the isocyanates shows that the polyisocyanate has reacted with the polyurethane extenders of the asphalt composition.

The analysis has also shown that the polyurethane-asphalt emulsions of long stability according to the invention are able to reticulate after breaking-down, even at ambient temperature.

The following examples illustrate the invention.

EXAMPLE 1

An asphalt composition is made by mixing asphalt of 180/220 penetration under agitation at 140° C. with hydroxytelechelic polybutadene (poly bd R45HT from the ARCO Company), in the proportion of 10/90 of HTPB/asphalt.

Meanwhile an aqueous phase is prepared at 60° C. containing 17.5 g/l of polyamines (Polyram S from the CECA Company) and 8.75 g/l of diamines (Dinoram S of CECA), then 24 g/l of 33% commercial hydrochloric acid is added.

The emulsion of the asphalt composition is made by emulsifying the asphalt composition at 140° C. and the aqueous phase at 60° C. in an "Emul-asphalt" type of apparatus. The apparatus is regulated so as to obtain an emulsion with 60% of binder.

Then, 40 parts of self-emulsifying diphenylmethane-4,4'-diisocayanate (MDI) (SUPRASEC 1042 of ICI) is emulsified under agitation with an Ultra Turrax apparatus.

Finally, 6 parts of the self-emulsifying diphenylmethane-4,4'-diisocyanate emulsion is added to 100 parts of the emulsion of the asphalt composition obtained above. The whole is homogenized by hand and a composite emulsion of long-lasting stability is obtained.

The various proportions are set out in Table 1 which follows.

ANALYSIS

A sample of emulsion is taken immediately after its production and broken down on AgCl surfaces for study by infra-red spectroscopy. The infra-red spectra of the film are recorded periodically and the percentage of isocyanate which has disappeared is evaluated with the ratio of intensity of the isocyanate band (2280 cm$^{-1}$). The results assembled in Table II hereafter show that the percentage of isocyanate decreases as a function of time, proving that the reaction takes place.

Meanwhile, the emulsion of the asphalt composition is broken down on a glass plate, drawing from it a film of 100 μm. In the same way the composite emulsion is broken down on a glass plate 2 hours after its production.

The broken down binders from the two emulsions are recovered, their characteristics are compared and they are treated with carbon tetrachloride. The results are assembled in Table III which follows.

The soluble fraction and the insoluble fraction are studied by infra-red. The soluble part contains the asphalt material while the insoluble part constitutes the polyurethane, verified by the presence of the urethane band at 1750 cm$^{-1}$ and the bands of the HTPB at 970 cm$^{-1}$ and 920 cm$^{-1}$.

EXAMPLE 2

An emulsion of asphalt composition is made as in example 1.

Meanwhile an emulsion of self-emulsifying diphenylmethane-4,4'-diisocyanate is made as in example 1, then it is stabilised by being mixed with 3 parts of an aqueous phase hydrochloride of polyamines, obtained by heating the water with 5.83 g/l of polyamines (Polyram S of CECA) and the addition of 8 g/l of 33% HCl (ratio by weight of polyamines/HCl=0.73).

24 parts of the MDI emulsion stabilised by polyamine hydrochloride is added to 100 parts of the emulsion of the asphalt composition.

As in example 1, the emulsion is broken down on glass plates and the broken down binder is compared to that of the emulsion of the asphalt composition. The characteristics are assembled in Table III which follows.

EXAMPLE 3

An emulsion of asphalt-HTPB and also an emulsion of MDI are prepared as indicated in example 1.

Then 6 parts of the emulsion of MDI is mixed with 100 parts of the emulsion of asphalt-HTPB.

This emulsion is then broken down by smearing it as a fine film on a steel plate and keeping it under an air current. Thus a film of 1.5 mm consisting of several layers of asphalt-polyurethane binder is made. Test pieces are cut from this film which are submitted to a tensile test. The following results were obtained:

| | | |
|---|---|---|
| at 0° C. and 100 mm/mn | Stress at threshold: | $1.6 \cdot 10^5$ Pa |
| | Elongation: | 300% |
| | (limit of the apparatus) | |
| at −15° C. and 100 mm/mn | Stress at threshold: | $2.4 \cdot 10^5$ Pa |
| | Elongation: | 56% |

These results show a very marked elastomeric character, due to the polyurethane.

The aqueous asphalt-polyurethane emulsion compositions obtained according to the invention are in particular useful for the production of:
  paints and coatings, particularly for waterproofing,
  mastics for filling joints and sealing cracks,
  grouts and cold-poured surfaces for surfacing of roads, aerodromes, sports grounds etc,
  cold coatings for surfacing as above,
  surface coatings for surfacing as above.

TABLE I

| COMPOSITE EMULSION | | | |
|---|---|---|---|
| ASPHALT EMULSION 60/40 (parts) COMPOSITION | | EMULSION OF MDI 40/60 (parts) COMPOSITION | |
| Binder (kg) | Aqueous phase (g/l.) | Binder (kg) | Aqueous phase (g) |
| Asphalt 180/220: 90 | Polyram S: 17.5 | Suprasec 1042: 40 | Water: 60 |
| HTPB: 10 | Dinoram S: 8.75 | | |
| | HCl: 24 | | |
| 100 | | 6 | |

TABLE II

| VARIATION OF THE PERCENTAGE OF ISOCYANATE AS A FUNCTION OF TIME | |
|---|---|
| Time (hr) | % NCO |
| 0 | 100 |
| 3 | 88.5 |
| 24 | 68 |
| 27 | 64.7 |
| 48 | 54.1 |
| 120 | 42.6 |
| 144 | 44 |

TABLE III

| | COMPOSITION | | |
|---|---|---|---|
| | EBI | EBI - EMDI | EBI - EMDIS |
| Time of rupture (hr) broken-down binder | 1.30 | 1 | 1 |
| Appearance | glossy sticky | dull non-sticky | dull non-sticky |
| Behaviour | non-elastic | elastic | elastic |
| Solubility in CCl$_4$ | total | partial | partial |

EBI: emulsion of asphalt composition
EMDI: emulsion of MDI
EMDIS: emulsion of MDI stabilized

What is claimed is:

1. A process for the preparation of an aqueous asphalt-polyurethane emulsion composition, comprising the following steps:
(A) preparing an emulsion of an asphalt composition from (a) an asphalt composition prepared by adding, at a temperature of 100° to 150° C., 20 to 90 parts of asphalt to 5 to 80 parts by weight of a polyurethane extender selected from the group consisting of a polyethyleneglycol, a polypropyleneglycol, the copolymers of polyethyleneglycol or polypropyleneglycol, polyester polyethers and a hydroxytelechelic polybutadiene and (b) an aqueous phase obtained by solution in water of 1 to 20% by weight of an emulsifier selected from the group consisting of polyamine hydrochloride, an amido-amine hydrochloride and a quaternary ammonium salt, by heating the asphalt composition (a) to a temperature of 120° to 150° C. and emulsifying it with the aqueous phase (b) at a temperature of 40° to 80° C.;
(B) preparing an unstabilized aqueous polyisocyanate emulsion by mixing, under strong agitation, 20 to 50 parts by weight of an organic polyisocyanate made up to 100 parts with water or a stabilized aqueous polyisocyanate by adding to said aqueous polyisocyanate emulsion a stabilizing amount of aqueous phase (b); and
(C) mixing emulsions (A) and (B) in an amount of from 4 to 50 parts of polyisocyanate emulsion (B) per 100 parts of asphalt emulsion (A), if said polyisocyanate emulsion (B) is unstabilized and from 15 to 120 parts of polyisocyanate emulsion (B) per 100 parts of asphalt emulsion (A), if said polyisocyanate emulsion (B) is stabilized.

2. The process according to claim 1, wherein the aqueous phase is obtained by dissolving a polyamine in water then adding hydrochloric acid until a weight ratio of polyamine/acid of 0.5 to 0.8 is obtained.

3. The process according to claim 1, wherein the aqueous phase is obtained by dissolving an amido-amine in water then adding hydrochloric acid until a weight ratio of amido-amine/acid of 2 to 3.5 is obtained.

4. The process according to claim 1, wherein the emulsion of asphalt composition (A) is obtained starting from an asphalt composition (a) taken to about 140° C. and an aqueous phase (b) taken to about 60° C., in a quantity such that the binder content of the emulsion is from 50 to 75% by weight.

5. The process to claim 4, wherein the binder content of the emulsion is about 60%.

6. The process according to claim 1, wherein the polyisocyanate is diphenylmethane-4,4'-diisocyanate.

7. The process according to claim 1, wherein before the mixing of (A) and (B) the aqueous polyisocyanate emulsion (B) is stabilized.

8. The process according to claim 7, wherein 1 to 9 parts by weight of aqueous phase are added for one part by weight of mother polyisocyanate emulsion.

* * * * *